US010707720B2

(12) United States Patent
Corcoran et al.

(10) Patent No.: US 10,707,720 B2
(45) Date of Patent: Jul. 7, 2020

(54) MOTOR HAVING IMPROVED STATOR CORE

(71) Applicant: Nidec Motor Corporation, St. Louis, MO (US)

(72) Inventors: Marc J. Corcoran, St. Charles, MO (US); Mark Emanuel, St. Louis, MO (US); Ryan M. Bastien, St. Charles, MO (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 16/240,454

(22) Filed: Jan. 4, 2019

(65) Prior Publication Data

US 2019/0214859 A1 Jul. 11, 2019

Related U.S. Application Data

(60) Provisional application No. 62/614,067, filed on Jan. 5, 2018.

(51) Int. Cl.
| | | |
|---|---|---|
| *H02K 17/00* | (2006.01) | |
| *H02K 5/10* | (2006.01) | |
| *H02K 1/22* | (2006.01) | |
| *H02K 1/16* | (2006.01) | |
| *H02K 5/20* | (2006.01) | |
| *H02K 17/04* | (2006.01) | |

(52) U.S. Cl.
CPC .............. *H02K 5/10* (2013.01); *H02K 1/165* (2013.01); *H02K 1/22* (2013.01); *H02K 5/20* (2013.01); *H02K 17/04* (2013.01); *H02K 2205/09* (2013.01)

(58) Field of Classification Search
CPC .......... H02K 3/522; H02K 5/10; H02K 1/165; H02K 1/22; H02K 5/20; H02K 17/04; H02K 2205/09
USPC ... 310/166, 168, 216.055, 216.064, 216.069, 310/216.071–216.075, 216.097, 254.1
See application file for complete search history.

(56) References Cited

U.S. PATENT DOCUMENTS

| | | | | |
|---|---|---|---|---|
| 4,563,606 A | * | 1/1986 | Fukasawa | H02K 3/12 310/164 |
| 4,831,301 A | * | 5/1989 | Neumann | H02K 1/16 310/184 |
| 5,998,904 A | * | 12/1999 | Hattori | H02K 1/165 310/156.19 |
| 6,424,070 B1 | | 7/2002 | Spano | |
| 6,664,703 B2 | | 12/2003 | Oketani et al. | |
| 6,894,414 B1 | | 5/2005 | Asao et al. | |

(Continued)

OTHER PUBLICATIONS

Hea-Joong Kim, et al., "Stator Shape Optimization for Electrical Motor Torque Density Improvement," Proceedings of the 2nd World Congress of Electrical Engineering and Computer Systems and Science (EECSS'16), Paper No. EE 126, Aug. 16, 2016.

*Primary Examiner* — Thanh Lam
(74) *Attorney, Agent, or Firm* — Hovey Williams LLP

(57) ABSTRACT

An induction motor assembly includes a motor. The motor includes a rotor rotatable about a rotor axis, and a stator at least substantially circumscribing the rotor. The stator includes a generally toroidal core. The core includes a generally circumferential yoke and a plurality of arcuately spaced apart teeth extending radially inwardly from the yoke. The tooth length is at least three (3) times the yoke thickness.

20 Claims, 14 Drawing Sheets

(56) References Cited

U.S. PATENT DOCUMENTS

| | | | |
|---|---|---|---|
| 6,938,323 B2 | 9/2005 | Katou et al. | |
| 7,015,664 B2 | 3/2006 | Coles et al. | |
| 7,466,055 B2 * | 12/2008 | Toide | H02K 1/187 |
| | | | 310/216.041 |
| 7,709,992 B2 * | 5/2010 | Hussey | H02K 3/02 |
| | | | 310/216.055 |
| 8,022,588 B2 * | 9/2011 | Yoshino | H02K 17/08 |
| | | | 310/179 |
| 8,222,788 B2 * | 7/2012 | Rose | F04C 18/0215 |
| | | | 310/195 |
| 8,841,807 B2 | 9/2014 | Taniguchi | |
| 9,564,791 B2 | 2/2017 | Wolf et al. | |
| 10,389,216 B2 * | 8/2019 | Tang | H02K 5/12 |
| 2015/0162789 A1 | 6/2015 | Tanaka et al. | |
| 2016/0006328 A1 | 1/2016 | Wang et al. | |
| 2016/0126818 A1 | 5/2016 | Bouarroudj et al. | |
| 2017/0047797 A1 | 2/2017 | Darras et al. | |

\* cited by examiner

MOTOR HAVING IMPROVED STATOR CORE

CROSS-REFERENCE TO RELATED APPLICATION

1. Priority Application

The present application claims priority from U.S. Provisional Patent Application No. 62/614,067, filed Jan. 5, 2018, the entire disclosure of which is hereby incorporated by reference herein.

2. Contemporaneously Filed Applications

The present application is filed contemporaneously with U.S. patent application Ser. No. 16/240,430, entitled MOTOR WITH SECTIONAL HOUSING, filed Jan. 4, 2019, the entire disclosure of which is hereby incorporated by reference herein.

BACKGROUND OF THE INVENTION

1. Field of the Invention

The present invention relates generally to a stator core. More particularly, the present invention relates to a stator core for an induction motor, wherein the stator core includes a yoke and a plurality of teeth extending from the stator core, and wherein the teeth are relatively long in comparison to the radial thickness of the yoke.

2. Discussion of the Prior Art

Those of ordinary skill in the art will appreciate that stator core designs struggle to facilitate optimal motor performance while reducing costs and minimizing detrimental effects such as noise. Stator core designs further struggle to facilitate simple, cost-effective manufacturing and assembly.

SUMMARY

According to one aspect of the present invention, an induction motor assembly is provided. The induction motor assembly includes a motor. The motor includes a rotor rotatable about a rotor axis, and a stator at least substantially circumscribing the rotor. The stator includes a generally toroidal core. The core includes a generally circumferential yoke and a plurality of arcuately spaced apart teeth extending radially inwardly from the yoke. Each of the teeth includes a radially extending arm. Each of the arms includes a base adjacent the yoke and an end spaced radially inwardly from the yoke. Each of the teeth further includes a crown extending arcuately from a respective one of the ends. Each of the crowns presents a radially innermost crown face. Each of the radially innermost crown faces includes a radially innermost tooth point. The radially innermost tooth points cooperatively define at least part of a circumferential inner core margin. Each pair of adjacent teeth defines a slot therebetween. The stator further includes electrically conductive wiring extending through at least some of the slots. The yoke presents an outer yoke face defining at least part of a circumferential outer yoke margin. The yoke further presents a plurality of arcuately spaced apart inner yoke faces. Each of the inner yoke faces extends between a pair of adjacent teeth and in part defines a corresponding one of the slots. Each of the inner yoke faces includes a radially outermost deepest slot point. The deepest slot points cooperatively define at least part of a circumferential inner yoke margin. The inner yoke margin is spaced radially from the outer yoke margin by a yoke thickness. The inner yoke margin is spaced radially from the inner core margin by a tooth length. The tooth length is at least three (3) times the yoke thickness.

Among other things, provision of a stator core including a yoke and a plurality of teeth, wherein the teeth have a tooth length that is at least three (3) times the yoke thickness, enables optimal motor performance.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with regard to the attached drawing figures, wherein.

Figure 1:
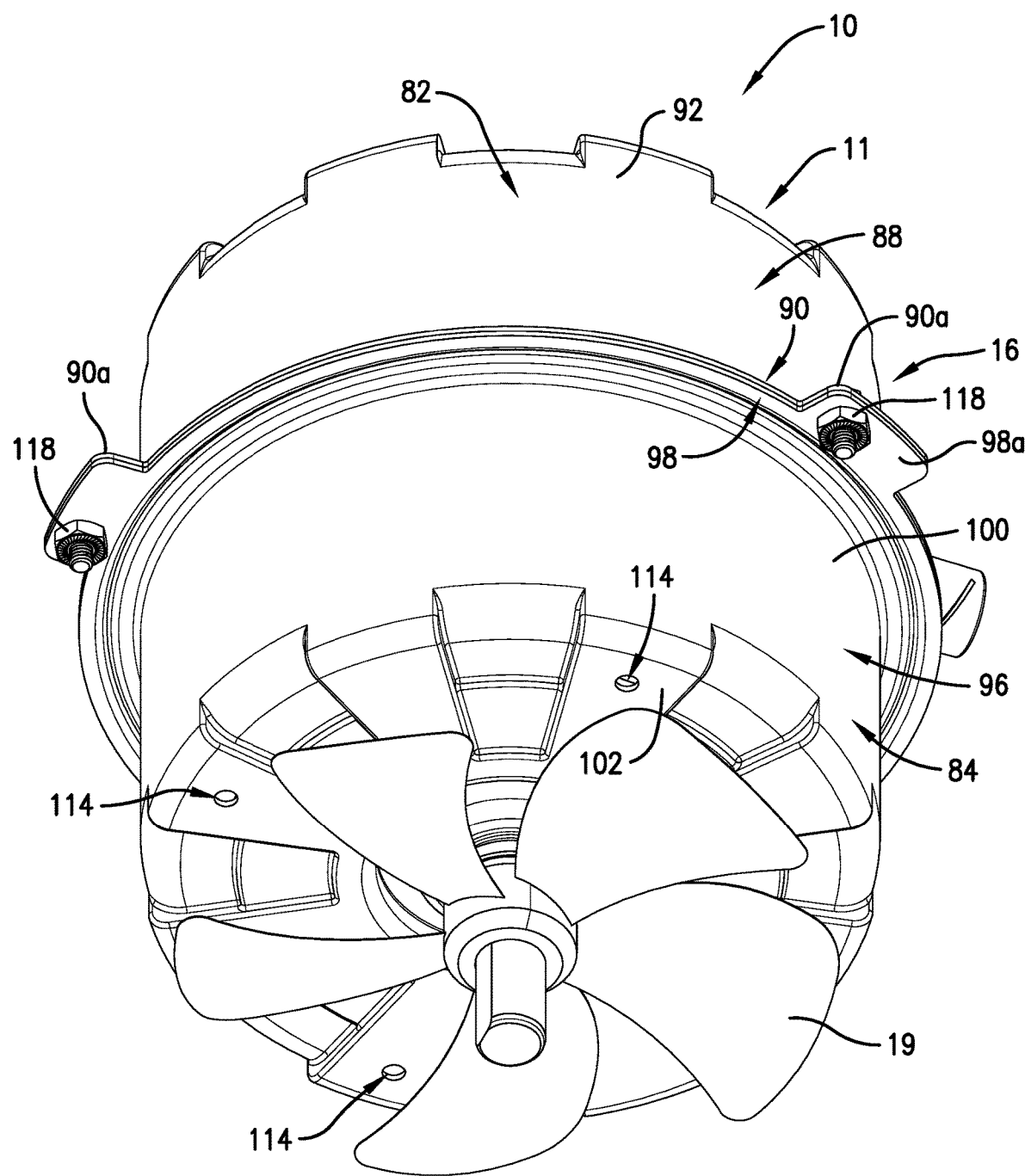
FIG. 1 is a bottom perspective view of a motor assembly constructed in accordance with the present invention, including a condenser fan.
Figure 1A:
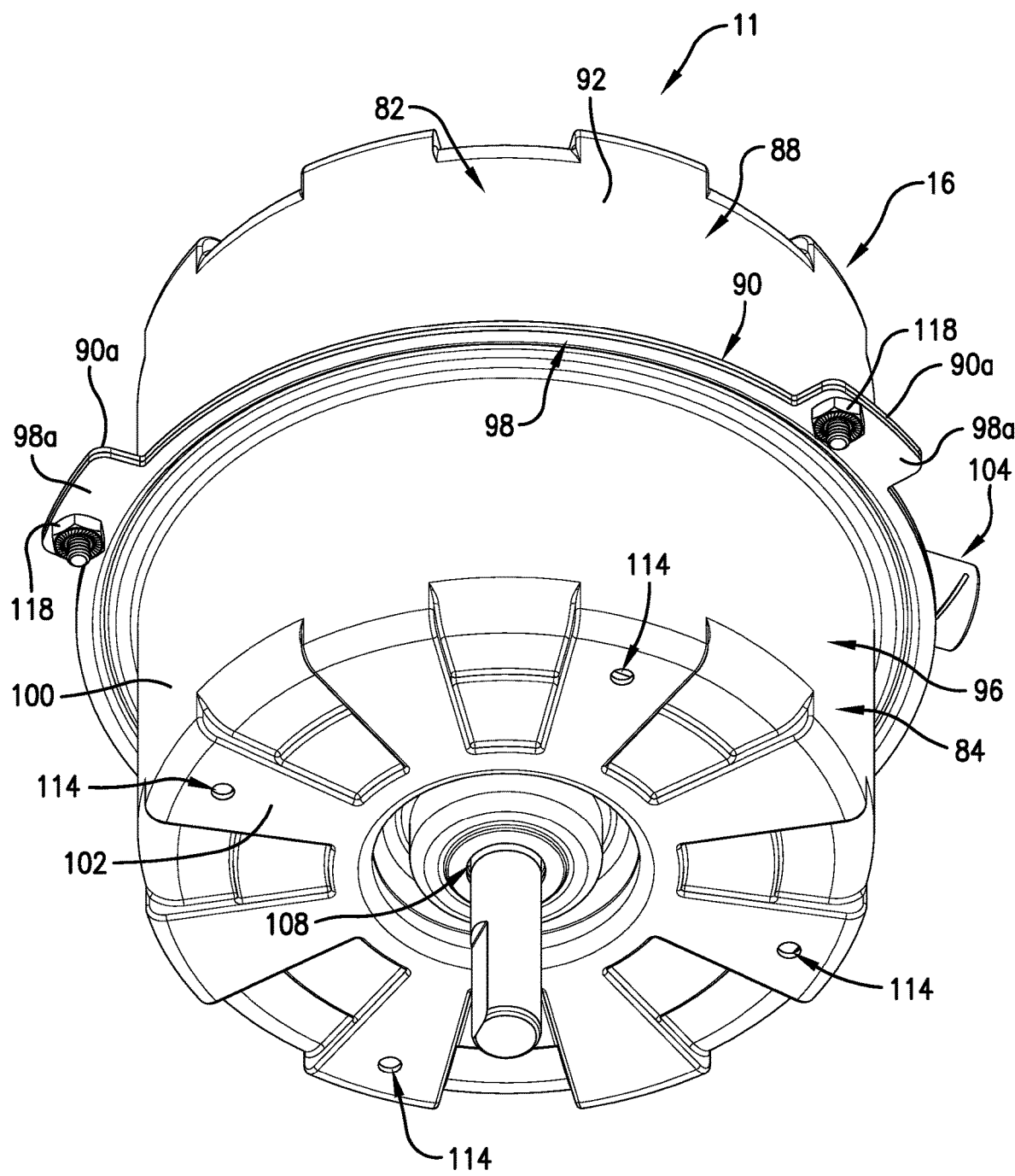
FIG. 1a is a bottom perspective view of the motor assembly of FIG. 1, with the condenser fan removed.
Figure 2:
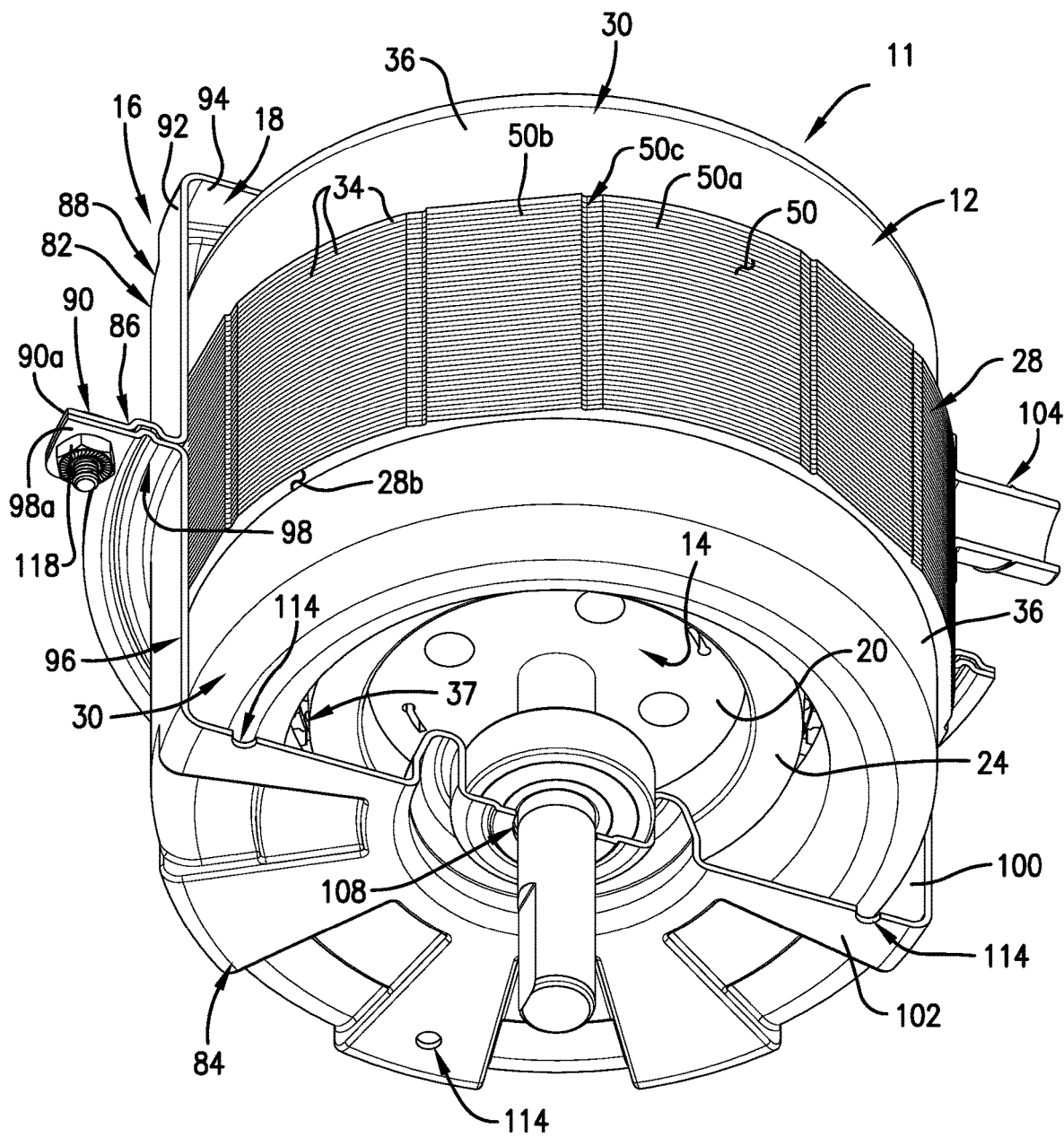
FIG. 2 is a partially sectioned bottom perspective view of the motor assembly of FIG. 1, with the condenser fan removed.
Figure 3:
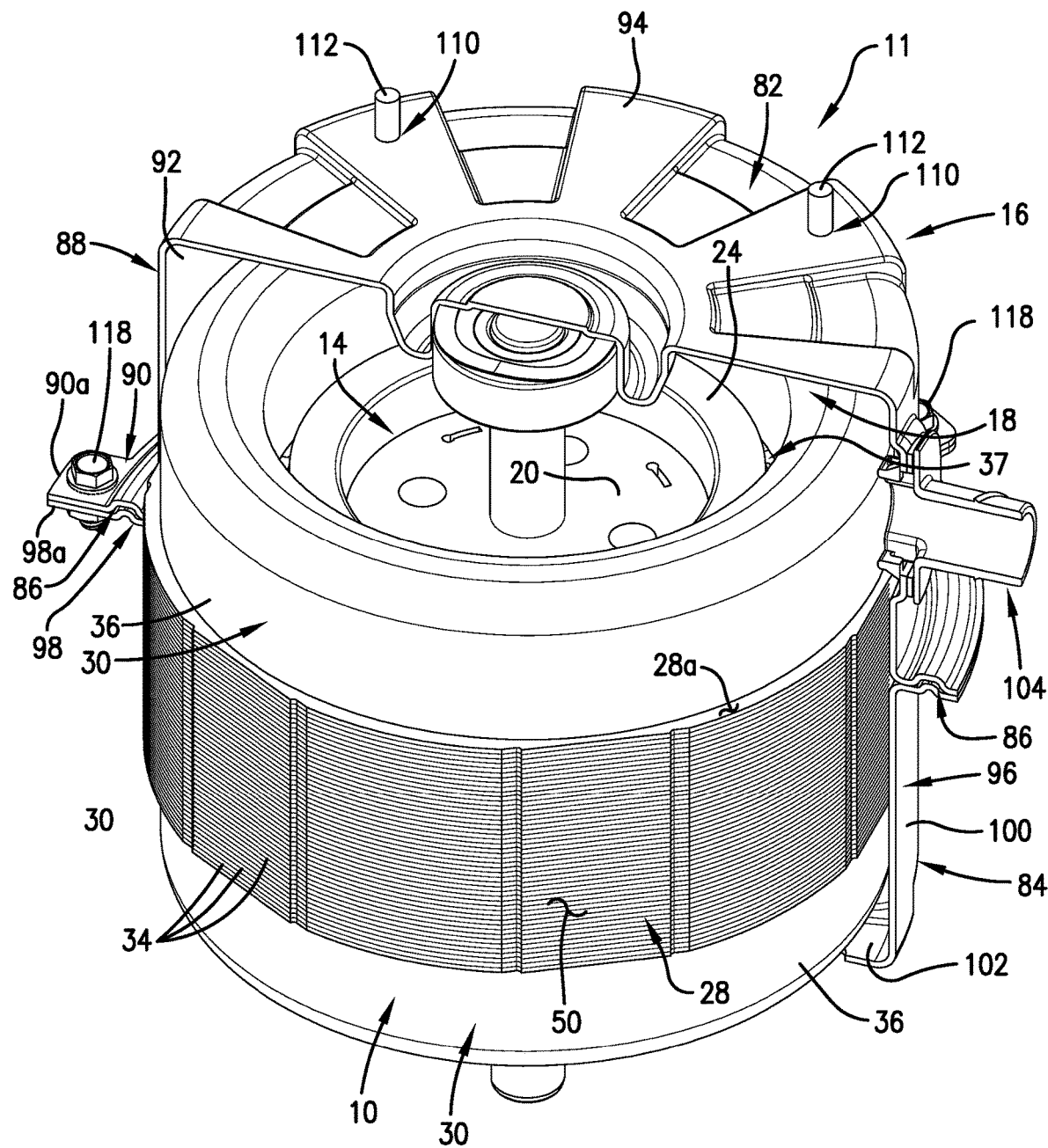
FIG. 3 is a top perspective view of the motor assembly as shown in FIG. 2.
Figure 4:
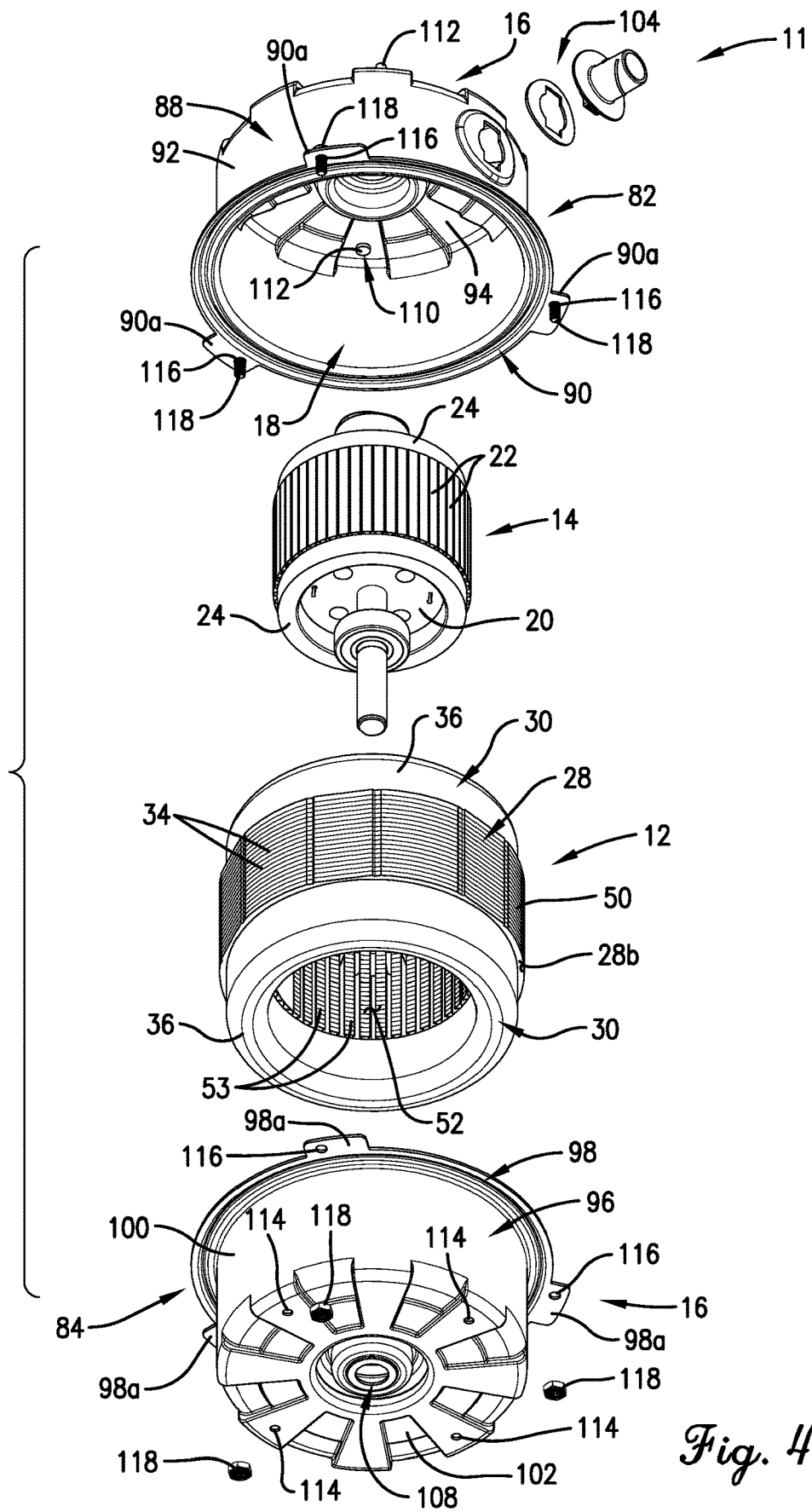
FIG. 4 is an exploded bottom perspective view of the motor assembly of FIGS. 1-3, with the condenser fan removed.
Figure 5:
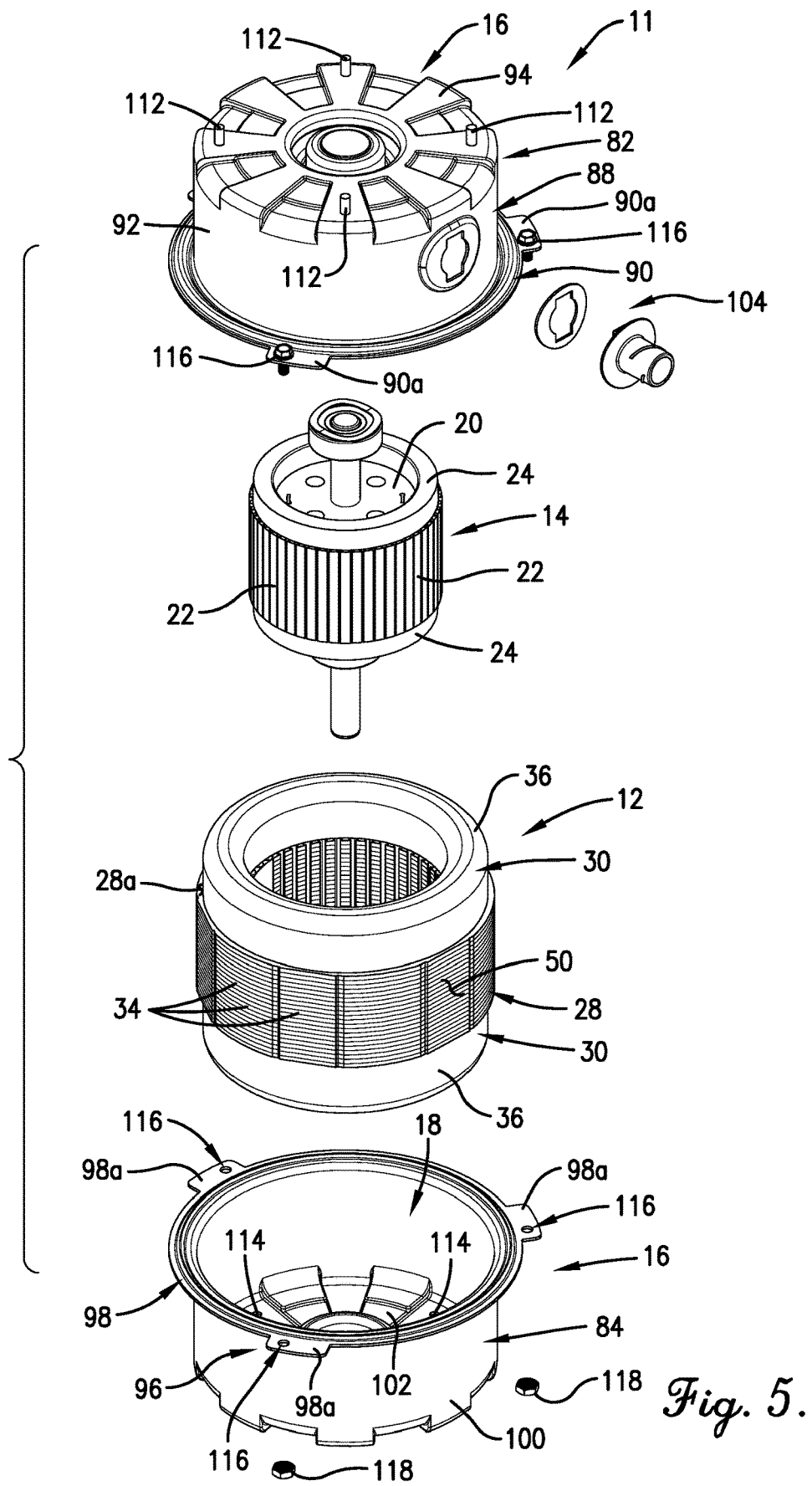
FIG. 5 is an exploded top perspective view of the motor assembly as shown in FIG. 4.
Figure 6:
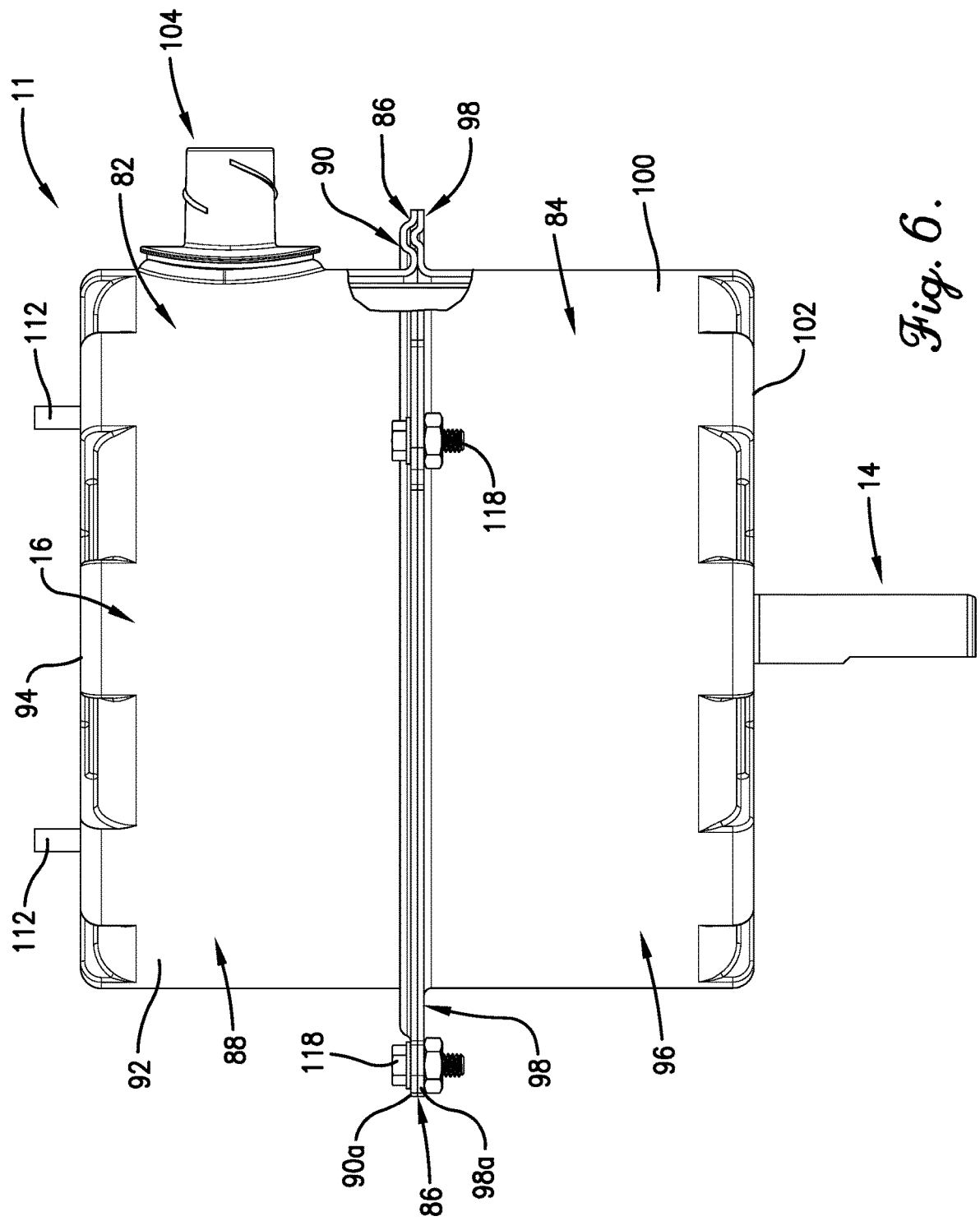
FIG. 6 is a partially sectioned side view of the motor assembly of FIGS. 1-5, with the condenser fan removed, and particularly illustrated the nested portion formed by the housing.
Figure 7:
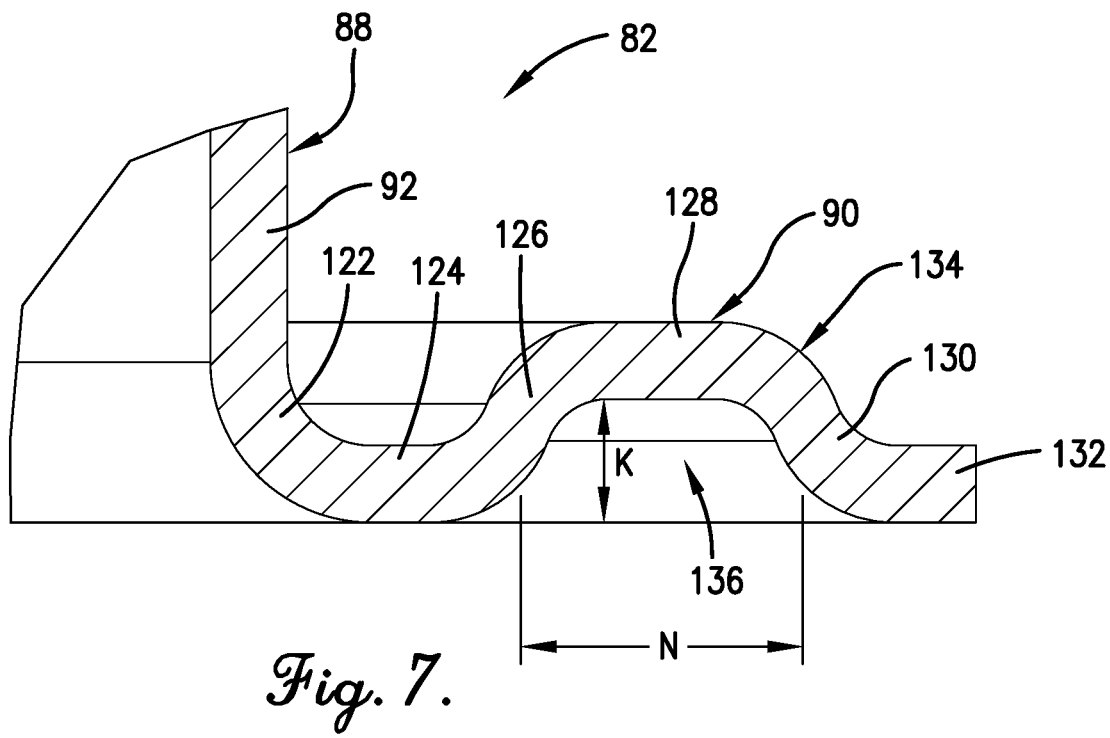
FIG. 7 is an enlarged cross-sectional view of the receiver of the nested portion of FIG. 6.
Figure 8:
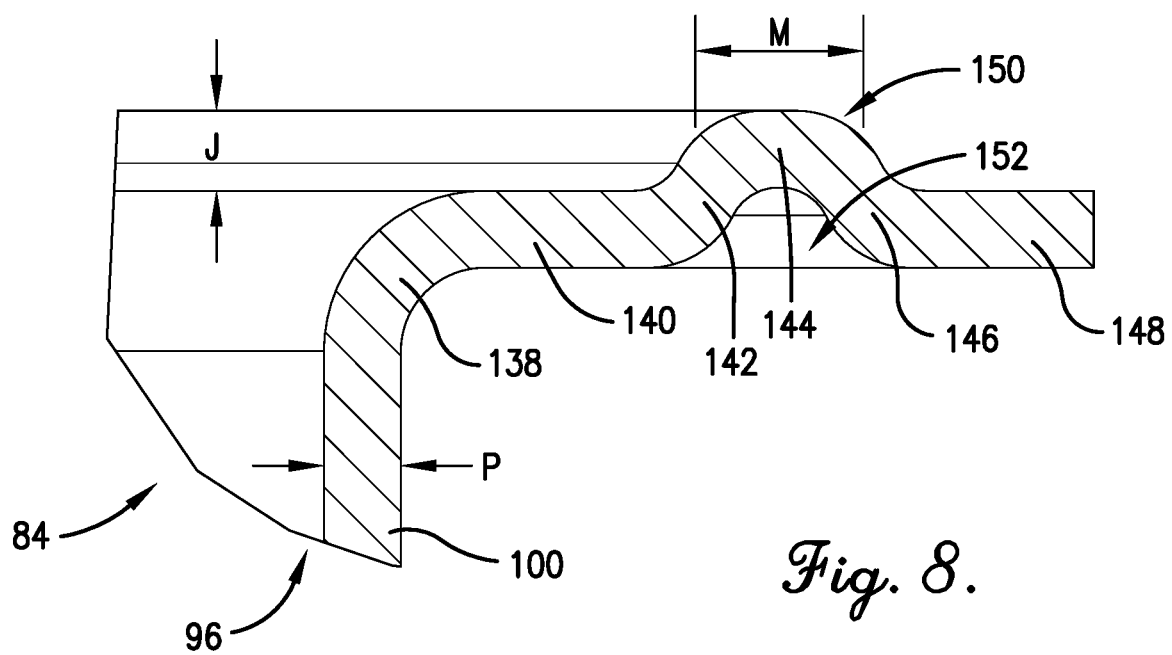
FIG. 8 is an enlarged cross-sectional view of the projection of the nested portion of FIG. 6.
Figure 9:
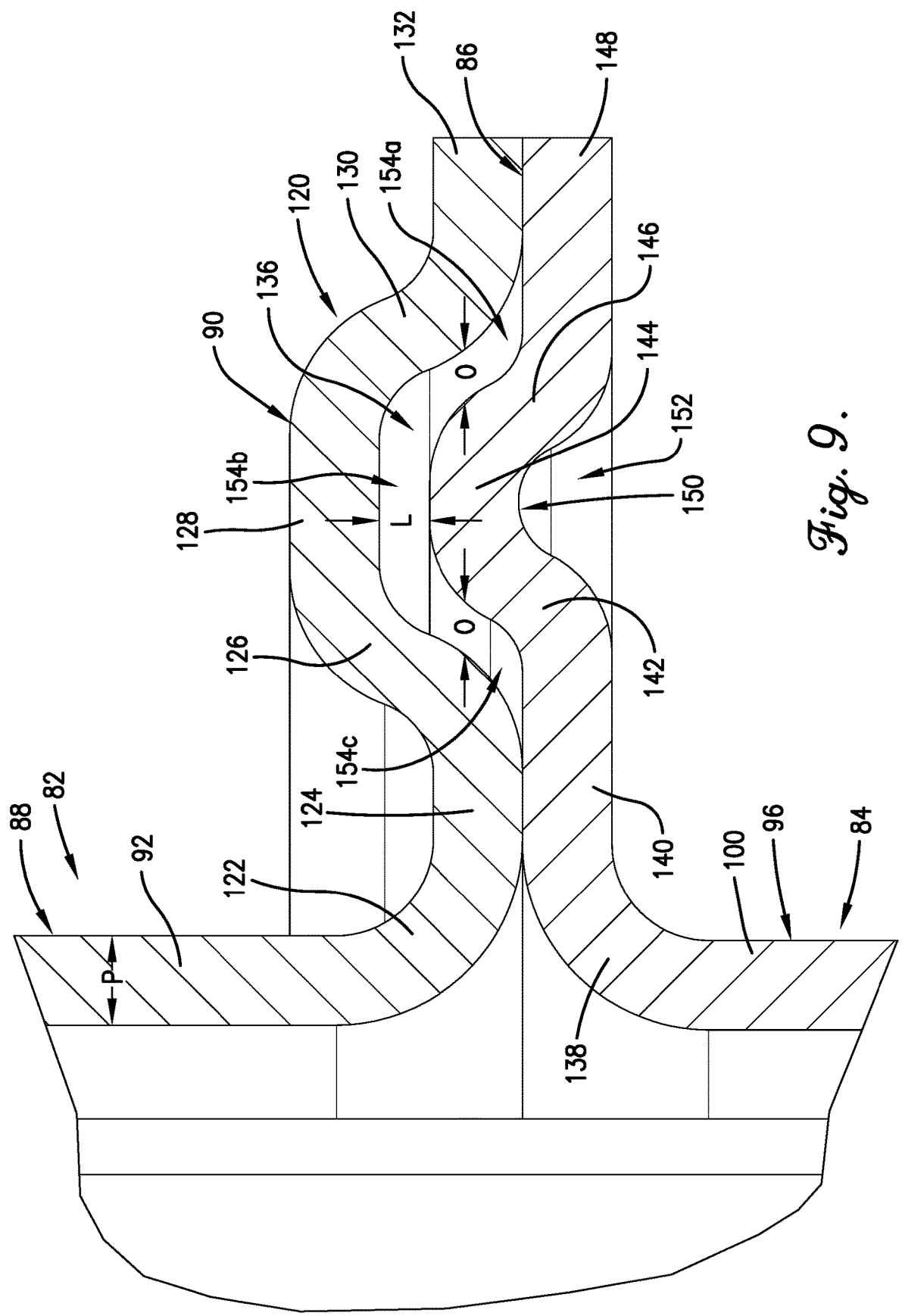
FIG. 9 is an enlarged cross-sectional view of the nested portion of FIG. 6.
Figure 10:
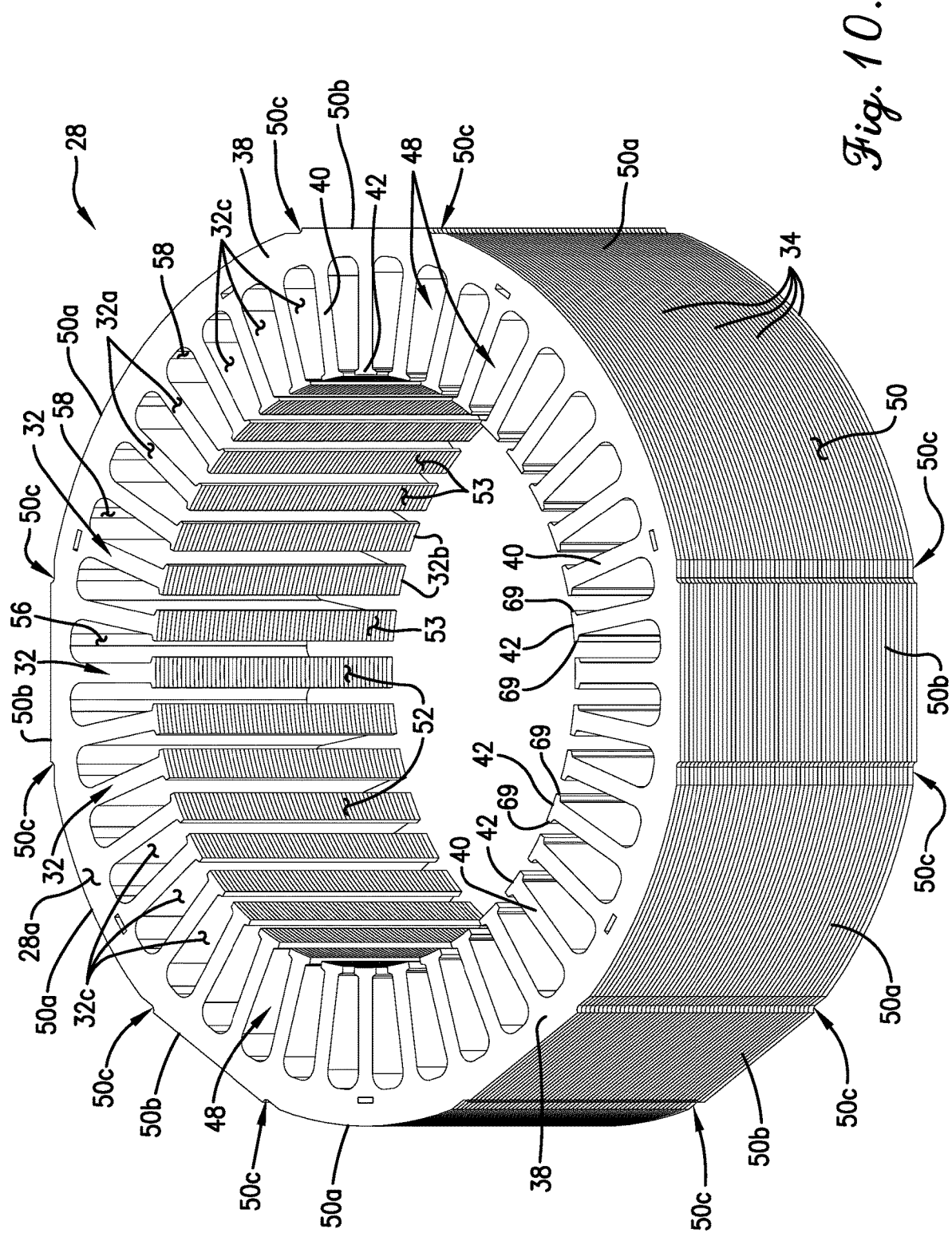
FIG. 10 is a perspective view of the stator core of the motor assembly of FIG. 1.
Figure 11:
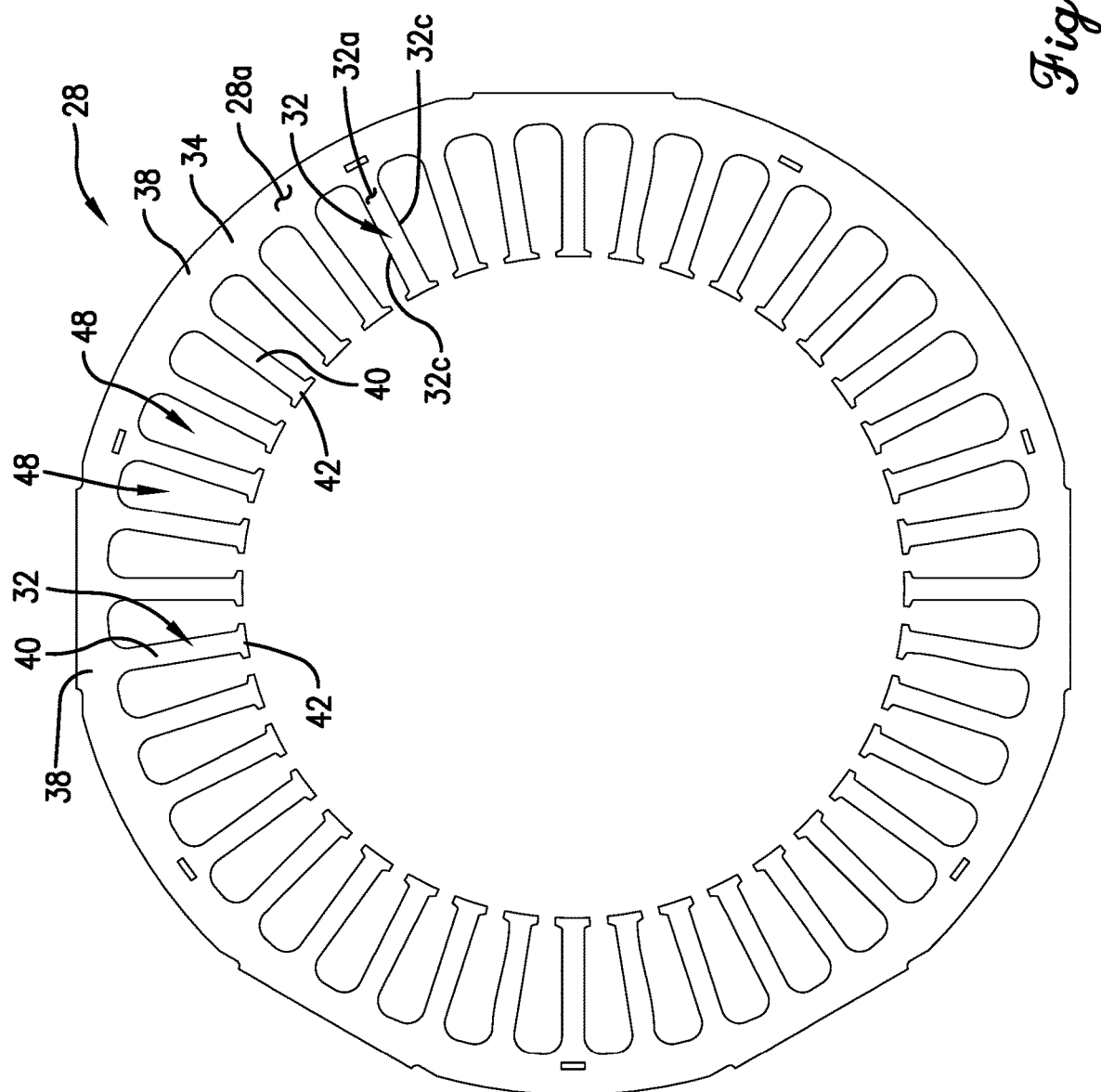
FIG. 11 is a top view of the stator core of FIG. 10.
Figure 12:
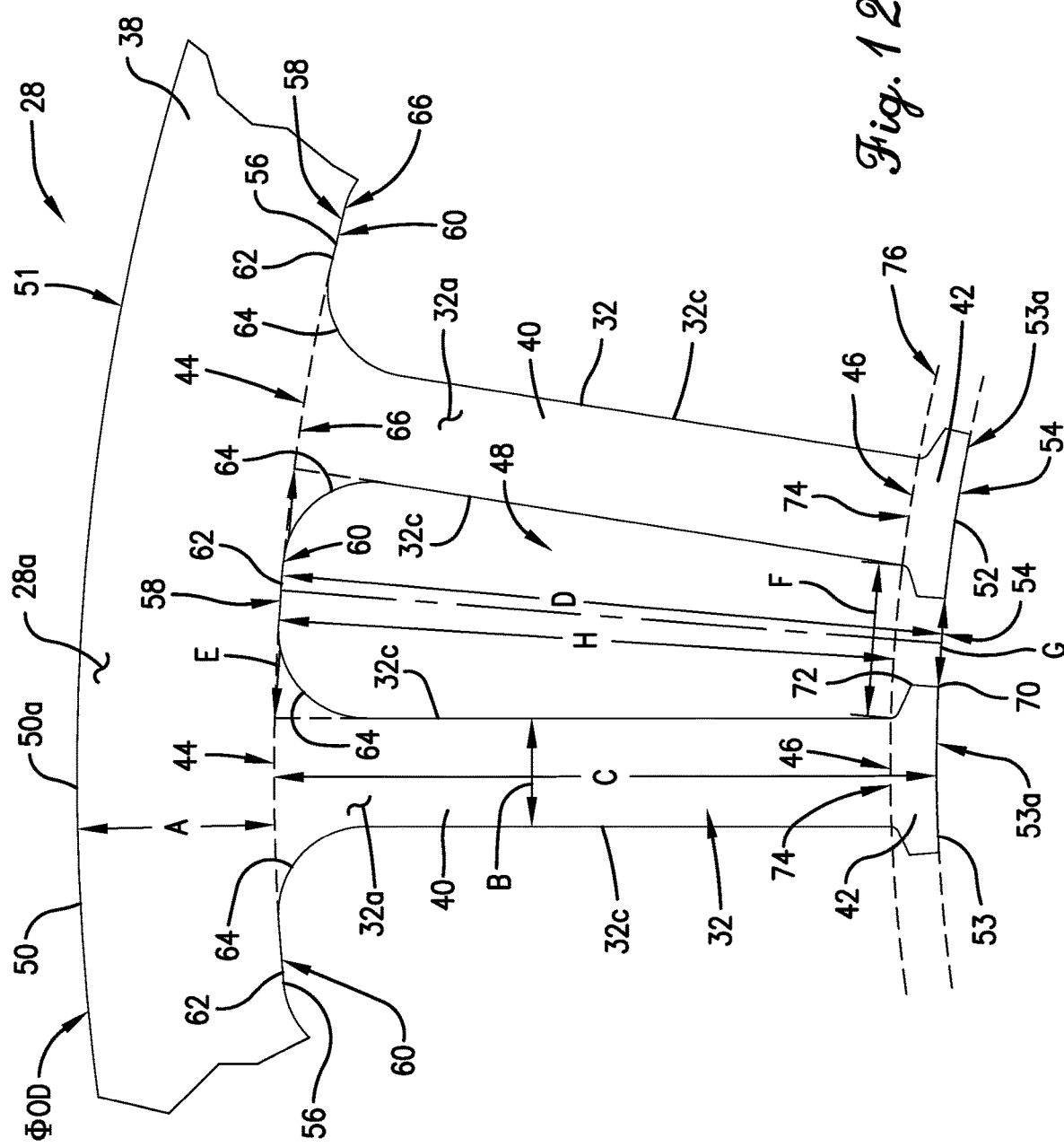
FIG. 12 is an enlarged top view of a portion of the stator core of FIG. 11.
Figure 12A:
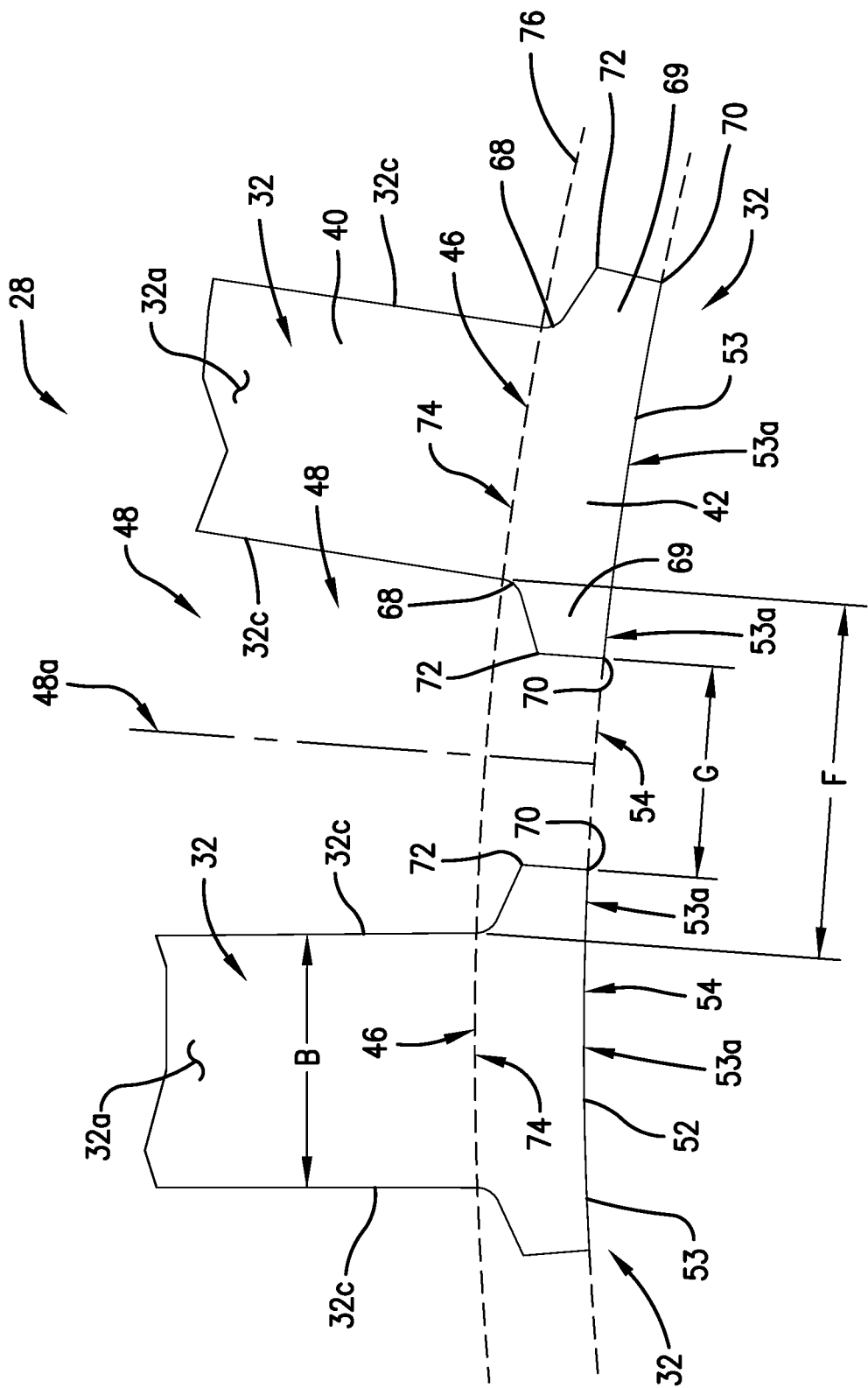
FIG. 12a is a further enlarged view of a portion of the teeth of FIG. 12.
Figure 13:
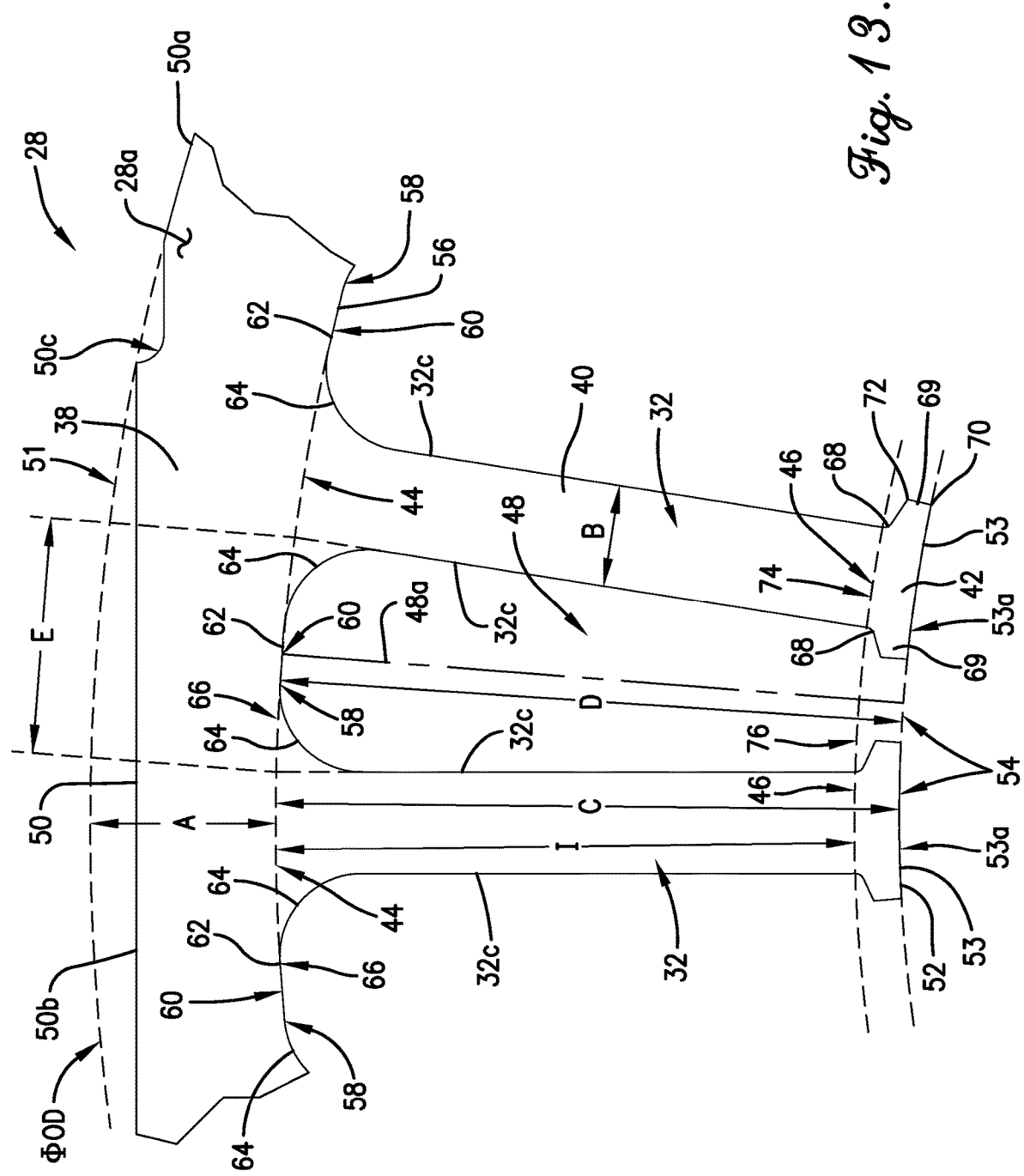
FIG. 13 is an enlarged top view of another portion of the stator core of FIG. 11.

The drawing figures do not limit the present invention to the specific embodiments disclosed and described herein. While the drawings do not necessarily provide exact dimensions or tolerances for the illustrated components or structures, the drawings are to scale with respect to the relationships between the components of the structures illustrated in the drawings.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (e.g., top, bottom, upper, lower, inner, outer, etc.) are used solely for the sake of convenience and should be understood only in relation to each other. For instance, a component might in practice be oriented such that faces referred to as "top" and "bottom" are sideways, angled, inverted, etc. relative to the chosen frame of reference.

Motor Overview

In a preferred embodiment of the present invention, a motor assembly 10 is provided. The motor assembly 10 includes a motor 11. The motor 11 preferably includes a stator 12 and a rotor 14 rotatable about an axis. The motor 11 further preferably includes a housing or shell 16 defining a motor chamber 18. The stator 12 and the rotor 14 are at least substantially received in the motor chamber 18.

The motor 11 is preferably an induction motor, although some aspects of the present invention are applicable to other motor types.

The motor 11 is most preferably a six (6) or eight (8) pole motor, although other numbers of poles are permissible according to some aspects of the present invention.

The motor 11 preferably presents a horsepower less than or equal to one third (⅓) hp. The horsepower is preferably greater than or equal to one tenth (1/10) hp. Most preferably, the motor horsepower is less than or equal to about one fourth (¼) hp. However, it is permissible according to some aspects of the present invention for the motor to operate at higher or lower horsepowers than those described herein as preferred.

The motor 11 is preferably for driving an air mover such as fan. In a preferred embodiment, for instance, the motor assembly 10 further includes a condenser fan 19 associated with a condenser (not shown). The motor 11 preferably drives the condenser fan 19. However, it is permissible according to some aspects of the present invention for the motor to be used in alternative air moving applications (e.g., those associated with heating, cooling, distribution or dissipation, evaporation, etc.) or entirely disparate applications.

The rotor 14 preferably includes a rotor core 20, a plurality of bars 22, and a pair of end rings 24 between which the bars 22 extend.

The stator 12 preferably includes a generally toroidal stator core 28 and a plurality of coils 30 wound about the stator core 28. The stator core 28 preferably comprises a plurality of teeth 32, as will be discussed in greater detail below. The stator core 28 is preferably a laminated stator core comprising a plurality of stacked laminations 34, although it is permissible according to some aspects of the present invention for the stator core to be non-laminated.

In a preferred embodiment, each lamination 34 is identical to each of the others and identically aligned therewith. However, it is permissible according to some aspects of the present invention for variations to occur amongst the laminations or for identical laminations to be rotationally offset relative to one another (e.g., to create axially discontinuous teeth or helically defined teeth).

The stator core 28 preferably comprises a ferromagnetic material such as steel, although use of any one or more electrically conductive materials is permissible without departing from the scope of the present invention. Most preferably, however, the stator core 28 comprises S85H2 steel.

The stator core 28 may be electrically insulated by means of electrically insulative endcaps, overmolding, powder-coating, liners, and/or other means. It is also permissible according to some aspects of the present invention for the stator core to be devoid of electrical insulation.

The coils 30 preferably comprise electrically conductive wiring 36. The wiring 36 is preferably wound multiple times about the teeth 32 to form a plurality of turns or loops. The wiring 36 is preferably formed of copper or aluminum, although any one or more of a variety of electrical conductive materials or a combination thereof may be used within the ambit of the present invention. Furthermore, the wiring 36 may be coated or uncoated. Most preferably, as will be discussed in greater detail below, the wiring 36 comprises aluminum.

As is customary, the wiring 36 is wound around the teeth 32 in a particular manner according to the configuration and desired performance characteristics of the motor 11. In a preferred embodiment, for instance, the wiring 36 is wound around the teeth 32 to form a distributed winding.

The motor 11 is preferably a single-phase motor, although it is permissible according to some aspects of the present invention for the motor to be a multi-phase motor.

The motor 11 is preferably an inner rotor motor, with the stator 12 at least substantially circumscribing the rotor 14. A circumferentially extending radial gap 37 is preferably formed between the stator 12 and the rotor 14. It is permissible according to some aspects of the present invention, however, for the motor to be an outer rotor motor or dual rotor motor.

Stator Core Design

The stator core 28 preferably includes a generally toroidal and most preferably circumferential yoke 38 extending about a stator axis. Most preferably, the stator axis and the rotor axis are coincident, such that the stator 12 and the rotor 14 are coaxial.

The stator core 28 further preferably includes the aforementioned plurality of arcuately spaced apart teeth 32, which extend radially inwardly from the yoke 38. Although true radial extension of each tooth 32 is preferred, with each tooth 32 extending directly toward the stator axis, it is permissible according to some aspects of the invention for some of all teeth to extend generally but not perfectly radially inwardly. That is, some of all of the teeth might be skewed away from the center of the stator core.

In a preferred embodiment, each of the teeth 32 includes a generally radial arm 40 and a crown 42. Although true radial extension of each arm 44 is preferred, with each arm 44 extending directly toward the stator axis, it is permissible according to some aspects of the invention for some of all of the arms (or, as noted above in a broader sense, teeth) to extend generally but not perfectly radially inwardly. That is, some of all of the arms might be skewed away from the center of the stator core.

Each arm 40 preferably includes a base 44 adjacent the yoke 38 and an end 46 spaced radially inwardly from the yoke 38. The crown 42 preferably extends generally circumferentially in both directions from the end 46.

Each tooth 32 is preferably symmetrical about a radially extending midline thereof, although asymmetry falls within the scope of some aspects of the present invention.

Each tooth 32 preferably presents an upper tooth face 32a, a lower tooth face 32b, and two side tooth faces 32c. The teeth 32 and the yoke 38 preferably cooperatively present an upper stator core face 28a and a lower stator core face 28b.

The teeth 32 are preferably evenly arcuately spaced apart, although uneven spacing is permissible according to some aspects of the present invention.

The coils 30 are preferably wound about the arms 40 of the teeth 32. More particularly, a slot 48 is defined between each adjacent pair of teeth 32. The coils 30 are preferably wound along the teeth 32 and through selected ones of the slots 48 in a pattern in keeping with the specific motor design (e.g., single-wound coils, multi-tooth coils, distributed winding, etc.)

The stator core 28 preferably includes forty (40) teeth 32 defining forty (40) slots 48 therebetween. Other numbers of teeth and slots fall within the scope of some aspects of the present invention, however.

The yoke 38 preferably presents a generally circumferential outer yoke face 50 (or outer stator core face 50). In a preferred embodiment, the outer yoke face 50 comprises a plurality of arcuate portions 50a alternating arcuately with tangentially extending flat portions 50b. A deburr notch 50c may be provided at each interface between adjacent arcuate portions 50a and flat portions 50b.

The arcuate portions 50a preferably extend along arcs of circles that are concentric with the stator and rotor axes. Furthermore, the arcuate portions 50a cooperatively define part of a cylindrical outer yoke margin 51 that is also preferably the outer stator core margin.

In a preferred embodiment, five (5) arcuate portions 50a and five (5) flat portions 50b are provided, although other numbers of arcuate portions and flat portions may be provided without departing from the scope of the present invention.

In a preferred embodiment, the flat portions 50b are provided to enable nesting of laminations 34 during the punching process in order to minimize scrap. It is permissible according to some aspects of the present invention, however, for the flat portions 50b to be omitted.

As illustrated, continuous circumferential extension of the yoke 38 is preferred. However, it is permissible according to some aspects of the present invention for the yoke to comprise a plurality of interconnected segments each corresponding to one or more teeth.

In a preferred embodiment, the stator core 28 presents an outer diameter OD, defined by the outer yoke margin 51, of between about three (3) inches and about seven (7) inches. More preferably, the outer diameter OD is between about four (4) inches and about six (6) inches. Most preferably, the outer diameter OD is about five and ninety-four thousandths (5.094) inches.

The flat portions 50b are preferably recessed inwardly relative to the arcuate portions 50a (or, alternatively stated, from the outer yoke margin 51) by between about five hundredths (0.05) inches at the respective midpoints thereof. The distance between any diametrically opposed flat portions 50b (or, alternatively, a diameter of a circle defined by arcs of circles extending between adjacent midpoints of the flat portions 50b) is about four and nine hundred ninety-four thousandths (4.994) inches. Variations in depth or recession of some of all of the flat portions is permissible without departing from the scope of certain aspects of the present invention, however.

The crowns 42 cooperatively present a discontinuous inner circumferential stator core face 52 that faces the rotor 14. More particularly, each crown 42 preferably presents a radially innermost crown face 53, with the crown faces 53 cooperatively presenting the inner stator core face 52.

In a preferred embodiment, each of the radially innermost crown faces 53 includes a radially innermost tooth point 53a. Such point 53a is nearer to or equally near to the stator axis than any other point along the crown face 53. In the preferred illustrated embodiment, for instance, the crown faces 53 are concentric with the stator axis, such that all points along the crown faces 53 are equidistant therefrom. Thus, any point along the crown faces 53 may be interpreted as being a radially innermost tooth point 53a. In other tooth designs, however, only a single point or a limited number of points may be nearest to the stator axis. In a tooth with tapered tips that turn away from the stator axis, for instance, points along the taper may be disposed radially outward of points along the midline of the tooth.

The radially innermost tooth points 53a of the crown faces 53 cooperatively define at least part of a circumferential inner core margin 54. As will be readily apparent from the above, in the illustrated embodiment, the crown faces 53 in their entireties extend along the inner core margin 54.

The yoke 38 preferably further presents a discontinuous intermediate circumferential stator core face 56 adjacent the bases 44 of the arms 40 and radially between the outer stator core face 50 and the inner stator core face 52. More particularly, the yoke 38 presents a plurality of arcuately spaced apart inner yoke faces 58 each extending between a pair of adjacent teeth 32. Each inner yoke face 58 also in part defines a corresponding one of the slots 48.

Each inner yoke face 58 includes a radially outermost deepest slot point 60. Such deepest slot point 60 is farther from or equally far from the stator axis than any other point along the corresponding inner yoke face 58. In the preferred illustrated embodiment, for instance, the yoke faces 58 each include a middle portion 62 and a pair of radiused portions 64 that transition to adjacent ones of the teeth 32. The middle portions 62 are concentric with the stator axis, such that all points along the middle portions 62 are equidistant from the stator axis. The radiused portions 64, on the other hand, are nearer to the stator axis than the middle portions 62 are to the stator axis. Thus, in the illustrated embodiment, any point along each of the middle portions 62 may be interpreted as being a deepest slot point 60.

Each slot 48 preferably defines a radially extending midline 48a. The deepest slot point 60 (or one of the deepest slot points 60, if multiple points qualify) of each inner yoke face 58 is most preferably disposed along the corresponding midline 48a, although offset designs fall within the scope of some aspects of the present invention.

The deepest slot points 60 cooperatively define at least part of a circumferential inner yoke margin 66. As will be readily apparent from the above, in the illustrated embodiment, the middle portions 62 of the inner yoke face 58 extend in their entireties along the inner yoke margin 66 (with the radiused portions 64 extending radially inward thereof).

In a preferred embodiment, as illustrated, the inner yoke margin 66 is spaced radially from the outer yoke margin by a yoke thickness A. The yoke thickness A is preferably between about fifty thousandths (0.050) inches and about three hundred fifty thousandths (0.350) inches. The yoke thickness A is more preferably between about one hundred twenty-five thousandths (0.125) inches and about two hundred seventy-five thousandths (0.275) inches. Most preferably, the yoke thickness A is about two hundred two thousandths (0.202) inches.

The arms 40 preferably present a tangentially measured arm width (or thickness) B between the corresponding portions of the tooth side faces 32c. The arm width B is preferably between about twenty-five thousandths (0.025) inches and about one hundred seventy-five thousandths (0.175) inches. The arm width B is more preferably between about seventy-five thousandths (0.075) inches and about one hundred twenty-five thousandths (0.125) inches. The arm width B is most preferably about one hundred eleven thousandths (0.111) inches. The arm width B is constant in a preferred embodiment but may vary radially without departing from the scope of some aspects of the present invention.

The arm 40 and crown 42 of each tooth 32 also preferably present a radially measured tooth length C. More particularly, the inner yoke margin 66 is spaced radially from the inner core margin 54 by a tooth length C.

Similarly, a full or crown slot depth D (which may be more generically simply referred to as the slot depth D) is defined as the radial distance between the inner yoke margin 66 and the inner core margin 54.

In a preferred embodiment, the tooth length C or, alternatively, the full slot depth D, is between about four hundred thousandths (0.400) inches and about nine hundred thousandths (0.900) inches. More preferably, the tooth length C or full slot depth D is between about five hundred thousandths (0.500) inches and about eight hundred thousandths (0.800) inches. Most preferably, the tooth length C or full slot depth D is about six hundred eighty thousandths (0.680) inches.

Each slot 48 has a base slot width E, an end slot width F, a tip slot width G, an arm slot depth H, and the aforementioned full or crown slot depth D. As will be discussed in greater detail below, the arm slot depth H is also preferably equivalent to an arm length I.

The base slot width E is defined as the tangential distance across the slot 48 between adjacent sides 32c of adjacent teeth 32, at a radial position corresponding to the bases 44 of the relevant arms 40. If radiusing is present (as in the preferred, illustrated embodiment at radiused portions 64), the measurement should be based on a hypothetical projection of the relevant tooth sides 32c rather than on the radiused portions 64 adjacent the corresponding inner yoke face 58. In the illustrated embodiment, for instance, the radiused portions 64 extend radially inward of the bases 44 and do not influence the base slot width E. Should radiusing be absent, a corresponding measurement would simply be taken directly between adjacent arm bases.

The base slot width E is preferably between about two hundred thousandths (0.200) inches and about three hundred thousandths (0.300) inches. More preferably, the base slot width E is between about two hundred twenty-five thousandths (0.225) inches and about two hundred seventy-five thousandths (0.275) inches. Most preferably, the base slot width E is about two hundred fifty-eight thousandths (0.258) inches.

The end slot width F is defined as the tangential distance across the slot 48 between adjacent sides 32c of adjacent teeth 32, at a radial position corresponding to the ends 46 of the relevant arms 40. If radiusing is present (as in the preferred, illustrated embodiment at radiused portions 68), the measurement should be based on a hypothetical projection of the relevant tooth sides 32c rather than on the radiused portions 68 adjacent the crowns 42. In the illustrated embodiment, for instance, the radiused portions 68 extend radially inward of the end 46 and do not influence the end slot width F. Should radiusing be absent, a corresponding measurement would simply be taken directly between adjacent arm ends.

The end slot width F is preferably between about fifty thousandths (0.050) inches and about two hundred fifty thousandths (0.250) inches. More preferably, the end slot width F is between about one hundred thousandths (0.100) inches and about two hundred thousandths (0.200) inches. Most preferably, the end slot width F is about one hundred fifty-eight thousandths (0.158) inches.

In a preferred embodiment, as illustrated, each crown 42 includes a pair of arcuately spaced apart tips 69, each defining radially innermost and radially outermost corners 70 and 72, respectively. Radiused portions 68 preferably extend between each arm 40 and the tips 69 extending therefrom. The tip slot width G is preferably defined as the tangential distance across the slot 48 between the radially innermost corners 70 of adjacent tips 69 of adjacent crowns 42. The tip slot width G is preferably between about fifty thousandths (0.050) inches and about one hundred fifty thousandths (0.150) inches. More preferably, the tip slot width G is between about seventy-five thousandths (0.075) inches and about one hundred twenty-five thousandths (0.125) inches. Most preferably, the tip slot width G is between about ninety-thousandths (0.090) and about ninety-two thousandths (0.092) inches.

Tangential midpoints 74 of the ends 46 of the arms 40 preferably cooperatively define at least part of a circumferential inner arm margin 76. The arm slot depth H or, alternatively, an arm length I, is preferably defined as the radial distance between the inner arm margin 76 and the inner yoke margin 66. The arm slot depth H or arm length I is preferably between about four hundred thousandths (0.400) inches and about nine hundred thousandths (0.900) inches. More preferably, the arm slot depth H or arm length I is between about five hundred thousandths (0.500) inches and about eight hundred thousandths (0.800) inches. Most preferably, the arm slot depth H or arm length I is about six hundred thirty-one thousandths (0.631) inches.

Most preferably, the stator laminations 34 present a high ratio of tooth length C (or slot depth D) to yoke thickness A. More particularly, the ratio of tooth length C to yoke thickness A is preferably greater than three (3). More preferably, the ratio of tooth length C to yoke thickness A is greater than three and twenty-five hundredths (3.25). Most preferably, as illustrated, the ratio of tooth length C to yoke thickness A is about three and thirty-seven hundredths (3.37).

The ratio of arm length I or arm slot depth H to yoke thickness A is similarly large in a preferred embodiment. For instance, the ratio of arm length I to yoke thickness A (or, alternatively, the ratio of arm slot depth H to yoke thickness A) is preferably greater than two and seventy-five hundredths (2.75). More preferably, the ratio of arm length I to yoke thickness A (or, alternatively, the ratio of arm slot depth H to yoke thickness A) is greater than three (3). Most preferably, as illustrated, the ratio of arm length I to yoke thickness A (or, alternatively, the ratio of arm slot depth H to yoke thickness A) is about three and twelve hundredths (3.12).

In the present design, such ratio is achieved both by provision of unconventionally long teeth 32 and an unconventionally thin yoke 38. However, it is permissible according to some aspects of the present invention for one of these dimensions to be in a conventional range, with the other being so unconventional or extreme as to achieve the desired ratio. For instance, conventional teeth with an extremely thin yoke or a conventional yoke with extremely long teeth could also conceivably accomplish the target ratio or ratios.

In the present design, the teeth 32 are also unconventionally thin or narrow (i.e., present a relatively low arm width B, as described above, particularly relative to the tooth length C and arm length I). For instance, the ratio of tooth length C to arm width B is preferably greater than five (5). More preferably, the ratio of tooth length C to arm width B is greater than five and five tenths (5.5). Most preferably, as illustrated, the ratio of tooth length C to arm width B is about six and thirteen hundredths (6.13). Similarly, the ratio of arm length I to arm width B is preferably greater than four and seventy-five hundredths (4.75). More preferably, the ratio of arm length I to arm width B is greater than five and twenty-five hundredths (5.25). Most preferably, as illustrated, the ratio of arm length I to arm width B is about five and sixty-eight hundredths (5.68). However, relatively thicker/wider teeth fall within the scope of some aspects of the present invention.

The above-described preferred ratios of tooth length C (or full slot depth D) to yoke thickness A; arm length I (or arm slot depth H) to yoke thickness A; arm width B to tooth length C (or full slot depth D); and arm width B to arm length I (or arm slot depth H) have been found to optimize motor performance and cost at low horsepowers. For instance, it has been determined that detrimental noise effects often associated with long, thin teeth are preferably largely mitigated by use of the stator core 28 in a motor 11 operating at a low horsepower, as described above. More particularly, such horsepower limitations help maintain acceptable levels of flux saturation in the core 28, which helps mitigate noise. Furthermore, the preferred tooth design maximizes the volume of the slots 48, enabling a higher volume of wiring 36 to be used. This in turn enables use of a more cost-effective wiring material such as aluminum (e.g., in contrast to copper) without degradation of motor performance.

Furthermore, it is particularly noted that the preferred dimensional relationships between parts of the stator core 28 (and, more particularly, the laminations 34 thereof) are most preferably such that conventional manufacturing techniques such as punching may be used to form the core 28 without undue difficulty, particularly when good manufacturing practices and equipment (e.g., proper material handling, good tooling, etc.) are used. That is, extreme dimensional relationships achievable only through use of specialized (and often expensive) techniques are preferably avoided.

Motor Housing Design

As noted previously, the stator 12 and the rotor 14 are preferably housed at least substantially within the housing 16. More particularly, the housing 16 defines the motor chamber 18, in which the stator 12 and the rotor 14 are at least in part and, more preferably, are substantially received.

The housing 16 is preferably at least substantially watertight so as to prevent or at least substantially restrict entry of moisture and/or other contaminants into the motor chamber. Such sealing ability is particularly advantageous in preferred outdoor motor applications, including but not limited to condenser fan applications as noted above.

In a preferred embodiment, the housing 16 includes first and second housing portions 82 and 84, respectively. The housing portions 82 and 84 engage each other along an interface 86, with the interface 86 forming a substantially watertight seal.

In a most preferred embodiment, the shared axis of the rotor and stator is upright (i.e., vertical), with the first housing portion 82 being disposed above the second housing portion 84. As will be apparent from the below, certain features of the present invention are particularly advantageous in this preferred orientation (e.g., due to the assistive forces of gravity). However, many aspects of the present invention are also applicable to other motor orientations (e.g., horizontal or angled, or completely inverted such that the second housing portion is disposed above the first housing portion).

For convenience and clarity and to clearly describe a most preferred embodiment of the present invention (as illustrated), the first and second housing portions 82 and 84 are referred to hereinbelow as "upper" and "lower" housing portions 82 and 84. However, it should be understood that, unless otherwise specified, according to certain aspects of the present invention, the descriptions below are applicable to alternative orientations of the motor. For example, one or more of the features described below as part of the "upper" housing portion 82 might instead be formed on the "lower" housing portion 84, and vice versa.

The upper and lower housing portions 82 and 84 each preferably comprise steel, although other materials (e.g., plastic or aluminum) may additionally or alternatively be used without departing from the scope of some aspects of the present invention. Most preferably, the portions 82 and 84 comprise forty-eight thousandths (0.048) inch thick stamped steel.

In a preferred embodiment, the upper housing portion 82 includes a main body 88 and a flange 90. The main body 88 includes a circumferentially extending sidewall 92 extending axially from a circular end wall 94. The flange 90 extends radially outwardly from the sidewall 92, axially opposite the end wall 94.

Similarly, the lower housing portion 84 includes a main body 96 and a flange 98. The main body 96 includes a circumferentially extending sidewall 100 that extends axially from a circular end wall 102. The flange 98 extends radially outwardly from the sidewall 100, axially opposite the end wall 102.

The sidewalls 92 and 100 are preferably at least substantially equally circumferentially sized and aligned with one another. The end walls 94 and 102 are also preferably at least substantially equally circumferentially sized and are axially spaced apart from one another.

The sidewalls 92 and 100 are preferably at least substantially continuously extending. That is, sidewalls 92 and 100 are preferably devoid of openings therethrough except as necessary for a wiring conduit 104 formed in the upper housing 82 through the sidewall 92. Such conduit 104, as well as any other openings that may be required for a given application, is preferably subject to appropriate sealing techniques to maintain the desired water and contaminant ingress resistance of the housing 16 as a whole.

A lower shaft opening 108 preferably extends through the end wall 102, although it is permissible according to some aspects of the present invention for both upper and lower openings, an upper opening only, or no openings at all to be provided through the housing for the shaft.

Most preferably, the upper housing portion 82 defines a plurality of mounting openings 110 for receiving mounting studs or fasteners 112 to secure the motor assembly 10 to the condenser (not shown) or other structure. Such openings 110 are preferably formed through the end wall 94.

The lower housing portion 84 preferably defines a plurality of ventilation openings 114 therethrough. More particularly, the end wall 102 defines the ventilation openings 114 therethrough. The ventilation openings 114 are preferably evenly arcuately spaced apart, although other positioning falls within the scope of the present invention.

A fan 115, such as the condenser fan described above with reference to a preferred application, is preferably disposed below the lower housing portion 84 (i.e., below the end wall 102) such that the fan 115 drives air upward through the ventilation openings 114 to generate a positive pressure in the motor chamber 18. An alternative apparatus for moving air (e.g., bellows, shiftable baffles, etc.) might be utilized in lieu of or in addition to the preferred fan.

The ventilation openings 114 may also permissibly enable moisture drainage therethrough (e.g., internal condensation in the motor chamber 18 exiting to the environment). Such drainage is likely most effective when the fan is not in operation, as counteractive air currents will be decreased (or altogether eliminated) in such a scenario.

It is noted that a variety of arrangements and configurations of mounting or ventilation openings are permissible according to some aspects of the present invention. The chosen arrangements are most preferably tailored to the end use of the motor assembly.

In a preferred embodiment, a plurality of arcuately spaced apart tabs 90a and 98a extend radially outwardly from respective ones of the flanges 90 and 98. Each pair of tabs 90a and 98a cooperatively defines a fastener-receiving hole 116. Each fastener-receiving hole 116 is configured to receive a corresponding fastener 118 to fix the housing portions 82 and 84 to one another. The fasteners 118 preferably comprise screws. However, other fastener types (e.g., nuts and bolts as illustrated, latches, etc.) or fixation techniques (e.g., welding, gluing, etc.) might be used within the scope of some aspects of the present invention.

In a preferred embodiment, the flanges 90 and 98 cooperatively define a nesting portion 120 that in part defines the interface 86. More particularly, the flange 90 of the upper housing portion 82 preferably includes a radiused portion 122 extending downwardly and outwardly from the sidewall 92, a radially extending inner contact portion 124 spaced from the sidewall 92 and extending from the radiused portion 122, an inner wall portion 126 extending obliquely upwardly and outwardly from the inner contact portion 124, an upper connecting portion 128 extending radially outwardly from the inner wall portion 126, an outer wall portion 130 extending obliquely downwardly and outwardly from the upper connecting portion 128, and a radially extending outer contact portion 132 extending outwardly from the outer wall portion 130. The inner and outer wall portions 126 and 130, along with the upper connecting portion 128, cooperatively form a circumferential receiver 134 that defines a circumferential receiving channel 136 therebelow.

In a complementary manner, the flange 98 of the lower housing portion 84 preferably includes a radiused portion 138 extending upwardly and outwardly from the sidewall 112, a radially extending inner contact portion 140 spaced from the sidewall 112 and extending from the radiused portion 138, an inner wall portion 142 extending obliquely upwardly and outwardly from the inner contact portion 140, an upper connecting portion 144 extending radially outwardly from the inner wall portion 142, an outer wall portion 146 extending obliquely downwardly and outwardly from the upper connecting portion 144, and a radially extending outer contact portion 148 extending outwardly from the outer wall portion 146. The inner and outer wall portions 142 and 146, along with the upper connecting portion 144, cooperatively form a circumferential projection 150 that defines a circumferential open channel 152 therebelow.

In keeping with the prior discussion of permissible orientations and configurations of the housing, it is noted that in some embodiments of the present invention, the upper housing portion might instead define the projection, with the lower housing portion defining the receiver.

The receiver 134 and the projection 150 each preferably extend continuously circumferentially and uniformly circumferentially (i.e., maintain their respective shapes). However, discontinuities and/or variations in shape are permissible according to some aspects of the present invention.

In a preferred embodiment, the projection 150 extends upwardly into the receiver channel 136 in such a manner such that (1) the inner contact portions 124 and 142 engage one another along the interface 86; (2) the outer contact portions 132 and 148 engage one another along the interface 86; and (3) a slim gap 154 is defined between the projection 150 and the receiver 134. That is, in a preferred embodiment, contact between the projection 150 and the receiver 134 is avoided. Such avoidance facilitates ease of assembly, with the gap 154 providing some degree of alignment tolerance for insertion of the projection 150 into the receiving channel 136.

As noted previously, the interface 86 preferably at least substantially prevents ingress of fluid into the motor chamber 18. Such restriction is by merit of at least (1) contact between the outer contact portions 132 and 148, (2) contact between the inner contact portions 124 and 142, (3) the small dimensions of the gap 154, and (4) the geometry/directionality of the gap 154.

With regard to the aforementioned contact between paired surfaces 82/84 and 132/148, the radiused portions 122 and 138 preferably extend toward each other until the inner contact portions 124 and 142 engage one another along the interface 86. The inner contact portions 124 and 142 are preferably at least substantially flat and orthogonal to the axis along the interface 86, although a variable interface (e.g., curved, zig-zagged, etc.) is permissible according to some aspects of the present invention. Similarly, the outer contact portions 122 and 128 are preferably at least substantially flat and orthogonal to the axis along the interface. Variations similar to those described with respect to the inner contact portions are also permissible, however.

With regard to the dimensions of the gap 154, as noted above, it is preferred that the gap 154 is large enough to allow interference-free insertion of the projection 150 into the receiver channel 136. However, in view of the preferred water ingress restrictions, and as discussed in greater detail below, the gap 154 should be small enough to generate substantive surface tension detrimental to flow of any water therethrough.

With regard to gap geometry and directionality, the gap 154 is also most preferably oriented such that water flow therethrough is hindered. For instance, in the illustrated motor orientation, the upward and inward slanting of the outer wall portions 130 and 146 from the outer contact portions 122 and 128 toward the connecting portions 128 and 144 creates an upwardly slanted outer portion 154a of the gap 154 that takes advantage of gravity to discourage water flow therethrough.

The general "labyrinthine" (or multi-directional, zig-zagging, tortuous, etc.) nature of the gap 154 is detrimental toward flow-through, as well. More particularly, in addition to the outer portion 154a, the gap 154 also preferably includes a generally horizontally extending middle portion 154b formed between the connecting portions 128 and 144 and extending radially inwardly from the outer portion 154a; and a downwardly slanted inner portion 154c formed between the inner wall portions 126 and 142 and extending downwardly and radially inwardly from the middle portion 154b.

In summary, the gap 154 is preferably small enough and tortuous enough to function in the aforementioned labyrinthine manner but large enough and simple enough to enable securement of the housing portions 82 and 84 to one another without (or at least substantially without) requiring axial force, deformation, and/or intensive positioning efforts.

The shape of the gap 154 (or, alternatively stated, the nesting portion 120 in a broad sense) is also preferably easily achieved using conventional manufacturing techniques. That is, sharp bends, overhangs, switchbacks, dovetails, and/or other complex or difficult/expensive to manufacture forms are preferably avoided. In a most preferred embodiment, as illustrated, the nesting portion 120 is simply formed by means of a stamping process.

Preferred dimensions of the receiver 134 and projection 150 forming the nesting portion 120 will vary in accordance with the overall size of housing 16. In a preferred embodiment, however, the projection 150 extends axially upwardly from the inner and outer contact portions 140 and 148 by a projection height J of about fifty thousandths (0.050) inches. In contrast, the receiving channel 136 has a receiving channel depth K of about seventy-seven thousandths (0.077) inches, such that a gap height L measured axially between upper connecting portions 128 and 144 of about twenty-seven thousandths (0.027) inches is defined. The projection width M is preferably about one hundred twenty thousandths (0.120) inches. In contrast, the receiving channel width N is about one hundred forty-seven thousandths (0.147) inches, such that a gap width O on each side is about one hundred twenty-five ten thousandths (0.0125) inches.

In a preferred embodiment, the inner wall portions 126 and 142 are parallel to one another and extend downwardly and inwardly from the upper connecting portions 128 and 144 toward the inner contact portions 124 and 142 at about forty-five (45) degrees relative to the axis. Similarly, the outer wall portions 130 and 146 are parallel to one another and extend upwardly and inwardly from the outer contact portions 124 and 142 toward the upper connecting portions 128 and 144 at about forty-five (45) degrees relative to the axis.

Variations in the above-described nominal dimensions and orientations, as well as relative dimensional relationships, are permissible according to some aspects of the present invention. It is most preferred, however, that any dimensional or angular variations are such that the advantages and functionality outlined above at least with respect to water ingress resistance, ease of assembly, and simplicity of manufacturing are maintained.

In some embodiments, as illustrated, the overall scale of the motor assembly 10 may be such that the inner and outer wall portions 126, 130, 142, and 146 are formed or at least substantially formed solely by oppositely oriented, adjacent radiused portions. However, it is permissible for entirely straight portions distinct from adjacent radiused portions to be present.

It is particularly noted that a relatively thick housing or shell 16 is preferred, with such thickness influencing the feasibility of various manufacturing techniques and nesting portion designs. For instance, both sharp bends and a thick shell would be very difficult to stamp effectively. More particularly, a shell thickness P is defined across the sidewalls 92 and 122 and end walls 94 and 102 is preferably forty-eight thousandths (0.048) inches, although other thicknesses are permissible according to some aspects of the present invention. Such thickness P is preferably at least substantially constant across the housing 16, although variations (e.g., thicker end walls, etc.) are permissible according to some aspects of the present invention.

The nesting portion 120 is also preferably shaped such that galvanization techniques may be successfully implemented. For instance, as will be readily understood by those of ordinary skill in the art, sharp bends are preferably avoided to enable galvanization to "wipe" properly. It is noted that other types of corrosion-inhibitors might be used, if preferred, or corrosion-inhibitors might be omitted entirely.

Preferably, as noted briefly above, the nesting portion 120, including both the projection 150 and the receiver 134, extends continuously circumferentially about the motor chamber 18 such that the seal formed along the interface 86 is continuous. Discontinuities are permissible according to some aspects of the present invention, however. Furthermore, the projection 150 and the receiver 134 are each preferably circumferentially uniform, although variations are also permissible within the scope of some aspects of the present invention.

In a preferred embodiment, the motor housing 16 is devoid of gaskets, o-rings, or other forms of compressible intermediate components designed to seal the housing upon compression thereof between the housing portions. That is, the nesting portion 120 acts to replace such features. Such omission is highly advantageous, eliminating the need for precise positioning of such compressible components and eliminating the possibility of housing failure (e.g., leakage of water or other contaminants into the motor chamber 18) upon shifting of the compressible component out of an acceptable position between the housing portions 82 and 84. Failure due to wear (including but not limited to deformation and/or disintegration) of a compressible component is also avoided. That is, the present most preferred design not only reduces component numbers and assembly complexity but also increases the reliability of the seal. However, it is permissible according to some aspects of the present invention for one or more gaskets, o-rings, etc. to be provided in addition to the nesting portion 120.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

What is claimed is:

1. An induction motor assembly comprising:
a motor including a rotor rotatable about a rotor axis, and a stator at least substantially circumscribing said rotor, said stator including a generally toroidal core,
said core including a generally circumferential yoke and a plurality of arcuately spaced apart teeth extending radially inwardly from the yoke,
each of said teeth including a radially extending arm,
each of said arms including a base adjacent the yoke and an end spaced radially inwardly from the yoke,
each of said teeth further including a crown extending arcuately from a respective one of said ends, each of said crowns presenting a radially innermost crown face, each of said radially innermost crown faces including a radially innermost tooth point, said radially innermost tooth points cooperatively defining at least part of a circumferential inner core margin, each pair of adjacent teeth defining a slot therebetween, said stator further including electrically conductive wiring extending through at least some of said slots, said yoke presenting an outer yoke face defining at least part of a circumferential outer yoke margin, said yoke further presenting a plurality of arcuately spaced apart inner yoke faces, each of said inner yoke faces extending between a pair of adjacent teeth and in part defining a corresponding one of said slots, each of said inner yoke faces including a radially outermost deepest slot point, said deepest slot points cooperatively defining at least part of a circumferential inner yoke margin, said inner yoke margin being spaced radially from said outer yoke margin by a yoke thickness, said inner yoke margin being spaced radially from said inner core margin by a tooth length, said tooth length being at least 3 times the yoke thickness.

2. The motor assembly of claim 1,
said motor generating ⅓ hp or less.

3. The motor assembly of claim 1,
said motor generating at least 1/10 hp and at most ¼ hp.

4. The motor assembly of claim 1,
said motor being a 6 pole motor.

5. The motor assembly of claim 1,
said motor being an 8 pole motor.

6. The motor assembly of claim 1,
said motor assembly further comprising an air mover,
said motor driving said air mover.

7. The motor assembly of claim 6,
said air mover comprising a condenser fan.

8. The motor assembly of claim 1,
said tooth length being at least 3.25 times the yoke thickness.

9. The motor assembly of claim 1,
said tooth length being about 3.37 times the yoke thickness.

10. The motor assembly of claim 1,
said tooth length being between about 0.400 inches and about 0.900 inches,
said yoke thickness being between about 0.050 inches and about 0.350 inches.

11. The motor assembly of claim 10,
said tooth length being between about 0.500 inches and about 0.800 inches
said yoke thickness being between about 0.125 inches and about 0.275 inches.

12. The motor assembly of claim 11,
said tooth length being about 0.680 inches,
said yoke thickness being 0.202 inches.

13. The motor assembly of claim 1,
each of said arms presenting a pair of arcuately spaced apart sides defining an arm width therebetween,
said base and said end of each of said arms defining an tooth length therebetween,
said tooth length being at least 5 times said arm width.

14. The motor assembly of claim 13,
said tooth length being at least 6 times said arm width.

15. The motor assembly of claim 1,
said outer yoke face including a plurality of arcuate portions extending along the outer yoke margin and a plurality of tangentially extending flat portions alternating arcuately with said arcuate portions,
said arcuate portions extending along said outer yoke margin.

16. The motor assembly of claim 1,
said core comprising a plurality of axially stacked laminations.

17. The motor assembly of claim 1,
said yoke extending continuously circumferentially.

18. The motor assembly of claim 1,
said radially innermost crown face extending along an arc of a circle.

19. The motor assembly of claim 18,
said circle being concentric with the rotor axis.

20. The motor assembly of claim 1,
each of said slots defining a radially extending midline,
each of said deepest slot points being disposed along a corresponding one of said radially extending midlines.

* * * * *